Figure 1:
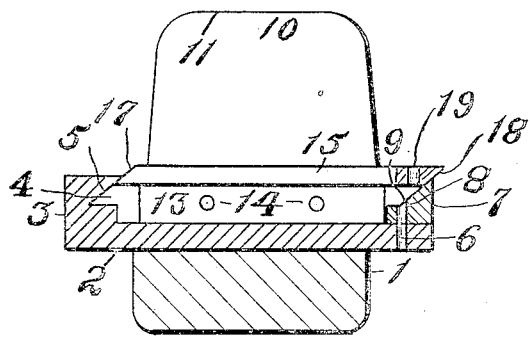

E. H. KOKEN.
VEHICLE TIRE AND RIM.
APPLICATION FILED JAN. 27, 1911. RENEWED MAR. 2, 1912.

1,039,760.

Patented Oct. 1, 1912.

2 SHEETS—SHEET 1.

Witnesses:
Austin B. Hanscom
Anna L. McClintock

INVENTOR—
Edward H. Koken,
By C. E. Humphrey
ATTORNEY.

E. H. KOKEN.
VEHICLE TIRE AND RIM.
APPLICATION FILED JAN. 27, 1911. RENEWED MAR. 2, 1912.

1,039,760.

Patented Oct. 1, 1912.

2 SHEETS—SHEET 2.

Witnesses:
Austin B. Hanscom
Anna L. McClintock

Inventor—
Edward H. Koken,
By C. E. Humphrey
ATTORNEY.

UNITED STATES PATENT OFFICE.

EDWARD H. KOKEN, OF AKRON, OHIO.

VEHICLE TIRE AND RIM.

1,039,760. Specification of Letters-Patent. Patented Oct. 1, 1912.

Application filed January 27, 1911, Serial No. 605,116. Renewed March 2, 1912. Serial No. 681,320.

*To all whom it may concern:*

Be it known that I, EDWARD H. KOKEN, a citizen of the United States, residing at Akron, in the county of Summit and State of Ohio, have invented new and useful Improvements in Vehicle Tires and Rims, of which the following is a specification.

This invention relates broadly to improvements in elastic tires for vehicle wheels and more particularly to those of the block tread type.

The primary object of this invention is to provide a tire composed of a plurality of independently removable blocks of resilient material, together with retaining means for holding said blocks in spaced relation with respect to each other to thereby provide transverse grooves or spaces between co-adjacent blocks whereby the elasticity of the tire and its road gripping properties are increased.

This invention contemplates the employment of blocks having outwardly projecting tread portions which are integral with or mounted on base portions which extend laterally beyond the faces of the tread portions to provide shoulders at the junction of the two portions of the blocks. The retaining means employed preferably embodies among other things a series of plates provided with apertures through which the tread portions of the blocks extend, these portions being arranged to nicely fill the apertures but preventing the passage therethrough of the base or laterally projecting portions of the same. These plates may be of such a size as to receive only a single block or said plates may be extended to constitute circumferential rings, provided with a plurality of apertures to receive a portion or all of the blocks constituting the tire, and compress the base portions thereof against the outer face of the wheel rim on which said blocks are mounted.

More specifically the invention especially resides in the means for holding the tire retaining members on the wheel rim in such a manner that they may be easily secured in position and readily removed to permit the removal of used or worn blocks and their replacement by new ones. The retaining means for the blocks are so constructed that when in operative position with respect to the blocks on the wheel rim that they will constantly clamp the base portions of the blocks for holding the latter against displacement or wear and thereby increase the efficiency and life of the blocks by carrying out the well-known rule that the effectiveness and life of an elastic tire is increased by a constant compression or pressure on the base portion thereof, the arrangement of the tire-retaining means being such that when placed in position for use it compresses or clamps the base of the tire.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claims hereunto appended.

Figure 2:
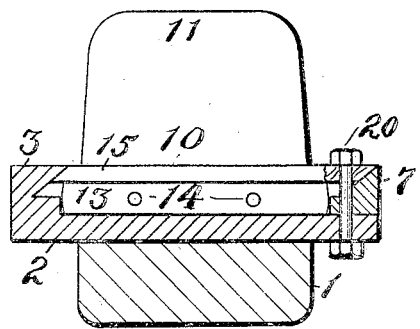
Figure 3:
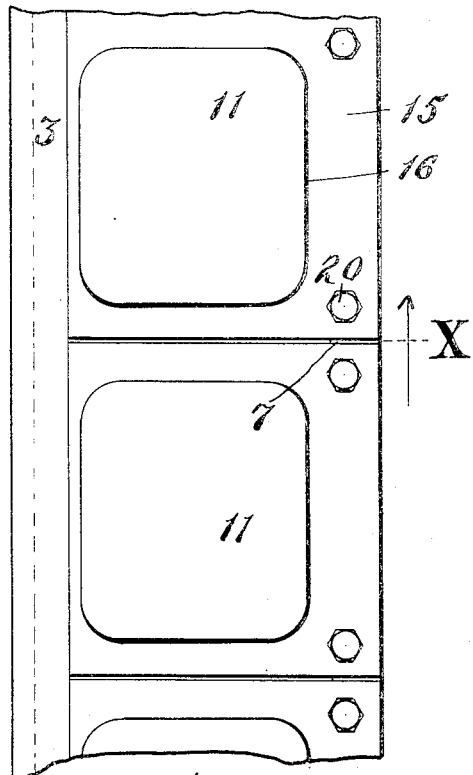
Figure 4:
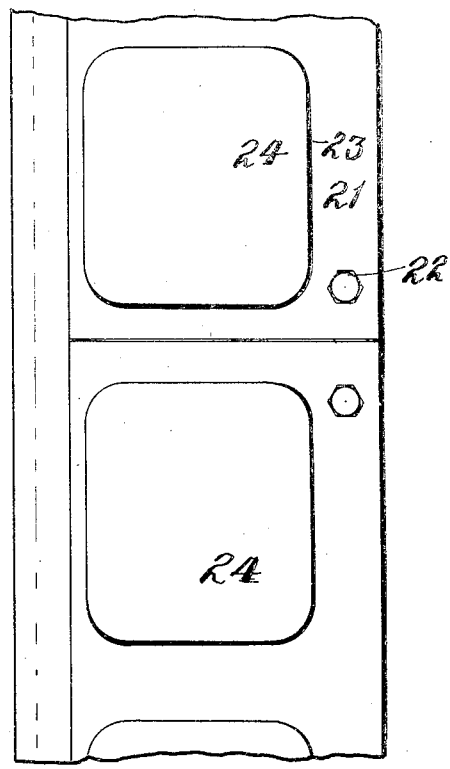
Figure 5:
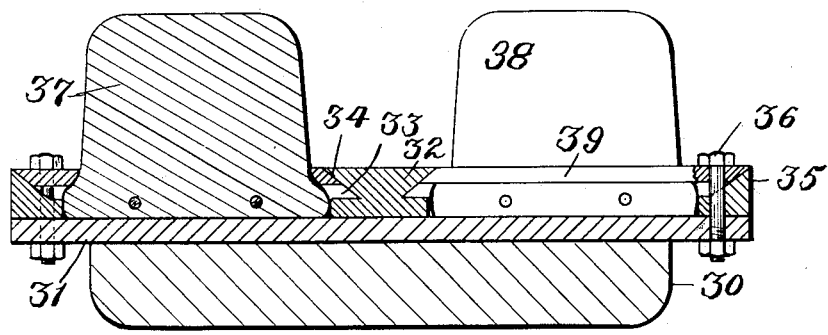
Figure 6:
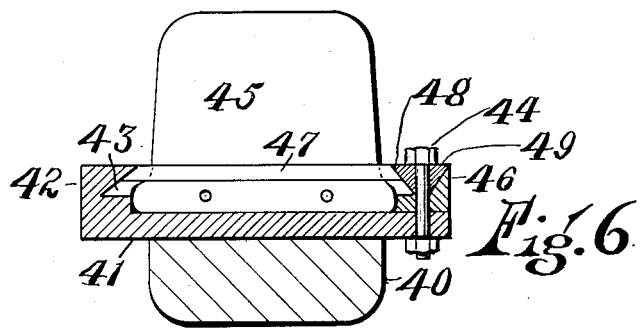
Figure 7:
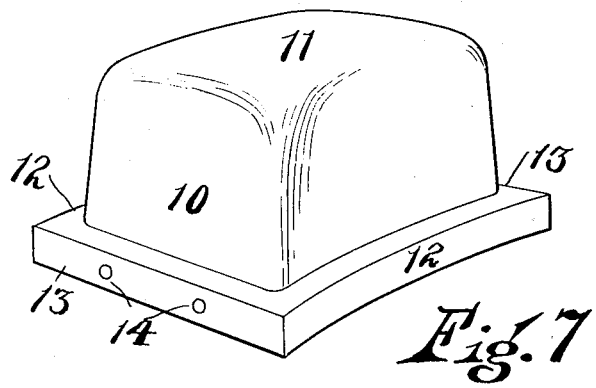

In the drawings in which similar reference numerals indicate like parts in the different figures, Figure 1, is a transverse sectional view of the rim portion of a vehicle wheel with a tire mounted thereon on line X of Fig. 3, with the tire retaining device arranged in position to be seated. Fig. 2, is a view similar to Fig. 1 with the parts assembled in position for use showing the base portion of the tire under compression and the tire-retaining means in its operative position; Fig. 3, is a plan of a portion of a vehicle tire constructed in accordance with this invention showing each block of the tire held by an individual tire-retaining plate; Fig. 4, is a view similar to Fig. 3 in which blocks are simultaneously held by a tire-retaining ring; Fig. 5, is a transverse sectional view of the rim portion of a vehicle wheel having mounted thereon a plurality of series of rubber blocks to provide a "dual" type of tire; Fig. 6, is a view similar to Fig. 2 showing a modified form of tire-retaining means, and Fig. 7, is a perspective view of a preferred form of elastic block to constitute a resilient portion of a tire constructed in accordance with this invention.

Referring to Figs. 1, 2, 3 and 4 of the drawings, the reference numeral 1 denotes the felly of a vehicle wheel, mounted on which is an annular, and preferably metallic rim 2 the outer face of which constitutes a seat for a tire. Along one of the edges of the rim 2 is an outwardly-extending flange 3 preferably formed integral with the rim 2. In the side face of the flange 3, which is adjacent to the tire seat, is a circumferential groove 4 the outer face 5 of which is at an acute inclination with respect to the tire seat. Adjacent to the opposite lateral face of the rim 2 are a plurality of apertures 6.

Mounted on the outer face of the rim 2 and immediately over the portion containing the aperture 6 is a circumferential band 7, which may be endless, or consist of a split ring as preferred, which is provided with a plurality of apertures 8 arranged to register with the apertures 6 when the device is set up. The outer face 9 of the band 7 is formed at an acute inclination with respect to the outer face of the rim 2 and approximately parallel with the wall 5 of the notch 4.

Mounted on the outer face of the rim 2 are a series of elastic blocks 10 preferably composed of vulcanized rubber and comprising outwardly-projecting tread portions 11 and preferably formed with extended base portions embodying laterally projecting ridges 12 and end ridges 13, and if desired, one or more longitudinally extending stiffening wires 14. These blocks are preferably so arranged on the outer face of the rim 2 that their end ridges 13 will be in abutting relation, thereby maintaining the tread portions 11 which receive the wear, in spaced relation with respect to each other to provide between coadjacent blocks an open space or transverse groove. In order to hold these blocks securely in position and at the same time keep the base portions of the blocks under continuous compression, to secure a maximum of effectiveness in the use of this type of tire, I preferably employ a plurality of retaining members, each embodying a plate 15 provided with an approximately central aperture 16 of a suitable size and configuration to permit the tread portion 11 of the block 10 to project therethrough, and which will snugly fit the lower portions thereof and rest upon the base portions of the block. Each of these plates is provided with a beveled portion 17 arranged to engage the wall 5 of the notch 4, and the opposite side 18 of each block is inclined approximately parallel to the beveled portion 17. Adjacent to the inclined portion 18 of each of the blocks are apertures 19 arranged, when said member 15 is positioned, to register with the openings 8 and 6 to receive hold-fast devices, such as bolts 20, for maintaining the parts in position when assembled. In this construction each block 10 is provided with an inclined retaining member 15 and each block is secured in position on the seat of the rim 2 separately, in doing which, the block is placed upon the seat and the retaining member placed thereover and its beveled edge 17 inserted under the inclined wall 5 of the notch 4 with the oppositely inclined face 18 resting on the outer face 9 of the band 7 somewhat as shown in Fig. 1. At this time, the base portion of the block is not under compression and the entire block will be held by the retaining plate slightly off center and nearer the ring 17 than the flange 13. A suitable clamp is then placed on the retaining plate 15 which forces it downwardly and laterally, the beveled face 17 following the wall 5 until the outer face of the member 15 is approximately flush with the outer face of the flange 3 and simultaneously bringing the apertures 19 into registration with the apertures 8 and 6 after which hold-fast devices 20 are passed through the registering apertures for holding the retaining member 15 in position. During this operation, the block 10 is moved laterally sufficiently to center it and at the same time, the base portion is compressed and kept under compression at all times by the retaining member 15, as shown in Fig. 2. The pressure of the retaining plate 15 is sufficient at all times to keep the inner face of the elastic block in constant contact with the seat on the rim 2, thereby eliminating to a large extent any wear between the two, due to any movement transmitted from the tread while under service condition, and also prevents the entrance of gritty substances and water between the base portions and the rim. It is pointed out that the hold fast device 20 is not intended to be used for seating the retaining member 15 and compressing the base of the rubber block, but is simply employed as a holding medium after the same has been clamped in position.

If desired, an annular split band 21, provided with suitable apertures, may be employed in place of the plurality of tire retaining members 15, this band being held at suitable points by means of hold-fast devices 22 similar to the hold-fast devices 20. The band in this case being provided with apertures 23 to receive the rubber tire blocks 24, in the same manner has been shown in Figs. 1, 2, and 3, the only difference being that instead of using the individual tire retaining members 15, a circumferential ring 21 is employed, but it is thought that a further description of this will be unnecessary.

In Fig. 5 is shown a rim constructed to hold a plurality of series of rubber blocks for constructing a wider or heavier tire. In this figure the reference numeral 30 denotes the felly on which is mounted the circumferential rim 31 the outer face of which constitutes a seat. Mounted on the seat is an annular band or ring 32 which may either be tightly or loosely mounted thereon.

The sides of the ring 32 are provided with grooves 33 similar to the grooves 4 in Fig. 1 and having outer inclined walls 34. Adjacent to the lateral edges of the rim 31 are openings similar to the openings 6 in Fig. 1. Mounted on the seat on the rim 31 and adjacent to the side edges thereof are annular bands 35, apertured to receive bolts 36. Mounted on the seat on the rim 31 are two series of rubber blocks 37 and 38 arranged to be alternately disposed with respect to each other. Both series of blocks are held in position by means of retaining plates or bands 39 similar in construction and function to the plates 15 or the bands 21, the construction of the entire device differing from the construction shown in Figs. 1, 2 and 3, only in the employment of the circumferential band 32.

In the modification shown in Fig. 6, the reference numeral 40 denotes the felly of a vehicle wheel on which is a rim 41 provided with an outwardly-extending flange 42, provided with a circumferential groove 43 similar in all respects to the rim 2 and also provided with apertures to receive bolts 44. On the seat on the rim 41 is a series of elastic blocks 45 similar to the blocks 10. Mounted on the seat on the rim 41 and adjacent to that side which is opposite to the flange 42 is an annular band 46 the upper face of which is inclined at a somewhat more acute angle to the tire seat than the upper face 19 of the band 7, in Fig. 1. The tire blocks are held in position by means of a tire retaining plate or band 47 having a beveled edge to engage in the groove 43 and with its opposite end 48 beveled in an opposite direction. The plate or band 47 is narrower than the plate or band 15 in Fig. 1 to provide a circumferential V-shaped groove or space between the beveled edge 40 and the upper inclined face of the band 46. Mounted in this circumferential V-shaped groove is a V-shaped ring 49 which is preferably made in the form of a split ring, to allow it being readily sprung into the groove. The grooved ring 49 and band 46 are properly apertured to receive the holding bolts 44. In this modification each of the plates or retaining ring 47 is held securely in the groove 43 by means of the locking ring 49 which performs identically the same function in this case in retaining the tire blocks in position as does the retaining plates or ring 15 in Fig. 1, where the inclined edge 18 rests on the inclined face 19 of the band 7.

The function performed by the retaining plates or rings shown in Figs. 1-4, as well as in the modifications illustrated in Figs. 5 and 6, serve to hold the blocks of resilient material securely mounted on the outer faces of the rims which constitute seats therefor and simultaneously compress or squeeze the base portions of the blocks so that at all times these portions of the blocks are compressed to obtain the highest amount of efficiency in the use of this type of tire.

I claim:

1. A vehicle wheel embodying a rim, an outwardly-projecting and circumferentially-extending element having a circumferential groove in one of the side faces thereof carried by said rim, a plurality of tire-forming blocks seated on said rim, each of said tire-forming blocks comprising an outwardly-projecting tread portion and a laterally-projecting base portion, a retaining member apertured to receive the tread portion of said tire-forming blocks and adapted to seat on the base portions thereof, one side edge of said member adapted to engage in said groove, means for securing the opposite side portion of said member to said rim.

2. A vehicle wheel embodying a rim, an outwardly-projecting and circumferentially-extending element having a circumferential groove in one of the side faces thereof carried by said rim, a plurality of tire-forming blocks seated on said rim, each of said tire-forming blocks comprising an outwardly-projecting tread portion and a laterally enlarged base, a retaining member apertured to receive the tread portion of said tire-forming blocks and adapted to engage in said groove, means for supporting the opposite side of said member on said rim and hold-fast devices extending through said supporting means for connecting said tire-retaining member and said rim for holding the former in position.

3. A vehicle wheel embodying a rim the outer face of which constitutes a tire seat and having apertures along one side each thereof, an outwardly-projecting and circumferentially-extending element with a lateral groove in one of the side faces thereof carried by said rim, a plurality of tire-forming blocks seated on said rim, a retaining member, apertured to permit the tread portions of said tire-forming blocks to project outwardly therethrough, one side edge of said member arranged to engage in said groove, means for supporting the opposite side of said member on said rim and means connecting said tire-retaining member and said rim and extending through apertures in the latter for holding the former in position.

4. A vehicle wheel embodying a rim, an outwardly-projecting and circumferentially-extending element carried by said rim, said element provided with a circumferential groove on one of the side faces thereof, the outer wall of said groove arranged at an acute inclination to said rim, a plurality of tire-forming blocks seated on said rim, each of said tire-forming blocks provided with an outwardly-projecting tread portion and a laterally enlarged base, a retaining member apertured to receive the tread portions of said tire-forming blocks and adapted to seat on the base portions thereof and having one side beveled, said beveled side adapted to bear against the outer inclined wall of said groove, means for holding the opposite side of said member in a position compressing the base portions of said tire-forming blocks.

5. A vehicle wheel embodying a rim, an outwardly-projecting and circumferentially-extending element carried by said rim, said element provided in one of the side faces thereof with a circumferential groove, a plurality of tire-forming blocks seated on said rim, each of said tire-forming blocks comprising an outwardly-projecting tread portion and a laterally enlarged base, a retaining member apertured to receive the tread portions of said tire-forming blocks and seated on the base portions thereof, one side edge of said member adapted to engage in said groove and means supporting the opposite side of said member on said rim for compressing the base portions of said tire-forming blocks.

6. A vehicle wheel embodying a rim, an outwardly-projecting and circumferentially-extending element carried by said rim, said element having a circumferential groove in one of the side faces thereof, a plurality of tire-forming blocks seated on said rim, each of said tire-forming blocks comprising an outwardly-projecting tread portion and a laterally enlarged base, a retaining member apertured to receive the tread portions of said tire-forming blocks and seated on the base thereof, one side edge of said member adapted to engage in said groove and simultaneously compress the base portions of said blocks and means for supporting the opposite side of said member on said rim.

7. A vehicle wheel embodying a rim constituting a seat for a tire and provided along one of its lateral sides with an outwardly-projecting flange having a circumferential groove formed in one of its side faces, a tire-forming block mounted on said seat with a base portion larger than its tread-portion, a retaining-member apertured to receive the tread-portion of said block and engaging said base-portion, one side edge of said member adapted to be inserted in said circumferential groove and means for securing the opposite side portion of said member to said rim.

8. A vehicle wheel embodying a rim provided with a series of openings along one of the side edges thereof, an outwardly-projecting and circumferentially-extending ring-forming element carried by said rim, said element provided with a circumferential groove in one of the side faces thereof, a plurality of tire-forming blocks seated on said rim, each of said tire-forming blocks comprising an outwardly-projecting tread-forming portion and a laterally-projecting base-portion, a retaining member provided with an opening near one side thereof complemental to one of the openings in said rim, the opposite side edge of said member adapted to engage in said groove and with the median portion of said member seated on the base portion of one of said tread-forming blocks and hold-fast devices arranged in said complemental openings for securing the free side portion of said member to said rim.

In testimony whereof I have hereunto set my hand in presence of two subscribing witnesses.

EDWARD H. KOKEN.

Witnesses:
C. E. HUMPHREY,
A. L. McCLINTOCK.